(12) United States Patent
Romrell et al.

(10) Patent No.: US 11,445,271 B2
(45) Date of Patent: Sep. 13, 2022

(54) REAL-TIME AD TRACKING PROXY

(71) Applicant: ARRIS Enterprises LLC, Suwanee, GA (US)

(72) Inventors: David A. Romrell, Hillsboro, OR (US); Yixiang Zeng, Beaverton, OR (US); Sean Michael Sheedy, Lake Oswego, OR (US); Matthew A. Milford, Waxhaw, NC (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/658,799

(22) Filed: Oct. 21, 2019

(65) Prior Publication Data

US 2020/0128305 A1      Apr. 23, 2020

Related U.S. Application Data

(60) Provisional application No. 62/747,973, filed on Oct. 19, 2018.

(51) Int. Cl.
*H04N 21/845* (2011.01)
*H04L 65/612* (2022.01)
(Continued)

(52) U.S. Cl.
CPC ..... *H04N 21/8456* (2013.01); *H04L 65/4084* (2013.01); *H04N 21/23439* (2013.01);
(Continued)

(58) Field of Classification Search
CPC ......... H04N 21/23424; H04N 21/2407; H04N 21/44204; H04N 21/812
See application file for complete search history.

(56) References Cited

U.S. PATENT DOCUMENTS 7,668,195 B2   2/2010   Stone
9,648,359 B2   5/2017   Romrell
(Continued)

OTHER PUBLICATIONS

PCT Invitation to Pay Additional Fees, Re: Application No. PCT/US2019/057222, dated Jan. 20, 2020.
(Continued)

*Primary Examiner* — Jeong S Park
(74) *Attorney, Agent, or Firm* — Chernoff, Vilhauer, McClung & Stenzel, LLP

(57) ABSTRACT

A method provides for tracking client playback events when playing an asset specified in a manifest for streaming adaptive bit rate (ABR) content. The method includes generating, with a manifest manipulator, a manifest that includes an asset URL inserted at a marker denoting a placement opportunity in a content manifest requested by a client. The manifest also includes callback URLs for tracking playback events to be returned by the client. The manifest manipulator sends the manifest to the client. At least one of the callback URLs is received by a tracking proxy associated with the manifest manipulator, indicating that the event has been performed by the client. In response, a tracking URL is obtained by the tracking proxy. The tracking URL is sent to at least one asset decision system participating in an asset decision process that resulted in providing the asset URL to the manifest manipulator.

31 Claims, 10 Drawing Sheets

(51) Int. Cl.
*H04N 21/858* (2011.01)
*H04N 21/2343* (2011.01)
*H04N 21/262* (2011.01)
*H04N 21/81* (2011.01)

(52) U.S. Cl.
CPC ..... *H04N 21/26258* (2013.01); *H04N 21/812* (2013.01); *H04N 21/8586* (2013.01)

(56) References Cited

U.S. PATENT DOCUMENTS

| | | |
|---|---|---|
| 2008/0244667 A1 | 10/2008 | Osborne |
| 2010/0086020 A1 | 4/2010 | Schlack |
| 2013/0132986 A1 | 5/2013 | Mack |
| 2014/0282641 A1* | 9/2014 | Fry ................. H04N 21/44218 725/10 |
| 2015/0067722 A1 | 3/2015 | Bjordammen |
| 2015/0128162 A1* | 5/2015 | Ionescu ............ H04N 21/44204 725/14 |
| 2015/0261600 A1* | 9/2015 | Iturralde ............. H04N 21/236 714/747 |
| 2017/0034593 A1 | 2/2017 | Ray |
| 2017/0041372 A1* | 2/2017 | Hosur ............. H04N 21/85406 |
| 2017/0085616 A1* | 3/2017 | Botsford ............... H04L 65/602 |
| 2017/0111665 A1 | 4/2017 | Suryanarayanan et al. |
| 2017/0289228 A1* | 10/2017 | Romrell ................. H04L 67/20 |
| 2017/0331872 A1 | 11/2017 | Levy |
| 2017/0359628 A1* | 12/2017 | Sachdev ......... H04N 21/44016 |
| 2018/0184143 A1 | 6/2018 | Davis |
| 2018/0241981 A1 | 8/2018 | Berger |
| 2018/0338168 A1* | 11/2018 | Du Breuil ........... H04L 65/4084 |
| 2018/0359502 A1 | 12/2018 | Romwell |
| 2018/0376220 A1 | 12/2018 | Ray |
| 2019/0045235 A1 | 2/2019 | Giladi |

OTHER PUBLICATIONS

International Preliminary Report on Patentability Re: Application No. PCT/US2019/057222 (dated Apr. 29, 2021).

* cited by examiner

REAL-TIME AD TRACKING PROXY

CROSS REFERENCE TO RELATED APPLICATION

This application claims the benefit of U.S. Provisional Application No. 62/747,973, filed Oct. 19, 2018, entitled "Real-Time Ad Tracking Proxy", the contents of which are incorporated herein by reference.

BACKGROUND

Multimedia delivery systems, such as those used by cable operators, content originators, over-the-top content providers, and so forth, deliver multimedia video content, software updates, webpages, and other information to client devices. Frequently, advertising is inserted into the multimedia content. Subscribers watch these advertisements on channels during commercial breaks, which are known as "avails," that occur during the multimedia playback. Subscribers may also watch video on demand content where inserted advertisements are known as pre-rolls, mid-rolls, or post-rolls. The various opportunities to insert advertising or other assets can be collectively known as "placement opportunities". The insertion of these advertisements provides a revenue source for not only the system provider but for content providers as well. Such advertising helps to offset the cost of creating and delivering programming to subscribers. The traditional way these service providers and system providers earn such revenue is via the insertion of advertisements. Placement opportunities and asset insertion can be used for many other purposes such as station identification/attributions, content promotional, breaking news or weather alerts, replacing restricted programs with alternate content or creating personal dynamic channels where each asset is selected by a recommendation engine or user profiles/locations, etc.

Multimedia content may be delivered to consumers as adaptive bitrate (ABR) streams. In this case, a manifest manipulator such as a manifest delivery controller (MDC) can perform dynamic targeted asset insertion that makes unique decisions for each streaming client, or groups of clients, as placement opportunities are discovered.

Operators of multimedia delivery systems often utilize external or third party ad decision system (ADS) to select the ads that are to be inserted in the placement opportunities. These ads are typically sent to the MDC in accordance with a protocol such as the Interactive Advertising Bureau (IAB) Video Ad Serving Template (VAST), which provides ad tracking. Such tracking may provide information such as the indication that an ad was played (e.g. impression tracking event), portion of an ad that was viewed (e.g., quartile tracking events), whether the ad was muted/unmuted, user interactions such as a click-through or fast-forwarded (if allowed), and so on. The tracking responses provided by the client devices are generally forwarded to the ADS or other systems and would often bypass the MDC. As a consequence the multimedia delivery system operators are not aware of the success rate of the ad insertion process. System operators also would like more control of the tracking process and the data that may be provided from their subscribers during the course of this process.

SUMMARY

In accordance with one aspect of the techniques described herein, a method is provided for tracking client playback events when playing an asset specified in a manifest for streaming adaptive bit rate (ABR) content. The method includes generating, with a manifest manipulator, a manifest that includes an asset uniform resource locator (URL) inserted at a marker denoting a placement opportunity in a content manifest requested by a client. The asset URL specifies a link to a file that includes an asset. The manifest also includes one or more callback URLs for tracking playback events to be returned by the client when a specified playback event is performed by the client while playing the asset. The manifest manipulator is used to send the manifest to the client. At least one of the callback URLs is received, which indicates that the client has performed the playback event specified by the at least one callback URL. Responsive to the receipt of the at least one callback event, a tracking URL is obtained with a tracking proxy associated with the manifest manipulator. The tracking URL is to be sent to at least one asset decision system participating in an asset decision process that resulted in providing the asset URL to the manifest manipulator. The tracking URL is sent from the tracking proxy to the at least one asset decision system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Adaptive bit rate streaming is a technique for streaming multimedia where the source content is encoded at multiple bit rates. It is based on a series of short progressive content files applicable to the delivery of both live and on demand content. Adaptive bit rate streaming works by breaking the overall media stream into a sequence of small file downloads, each download loading one short segment, or chunk, of an overall potentially unbounded content stream.

As used herein, a segment or chunk is a small file containing a short duration section of video (typically 2 to 10 seconds but can be as short as a single frame in some implementations) along with associated audio and other data. Sometimes, the associated audio and other data are in their own small files, separate from the video files and requested and processed by the ABR client(s) where they are reassembled into a rendition of the original content. Adaptive streaming may use, for instance, the Hypertext Transfer Protocol (HTTP) as the transport protocol for these video segments. For example, ' segment' or ' segment files' may be short sections of media retrieved in an HTTP request by an ABR client. In some cases these segments may be standalone files, or may be sections (i.e. byte ranges) of one much larger file. For simplicity the term 'segment' or 'chunk' is used to refer to both of these cases (many small files or fewer large files).

Adaptive bit rate streaming methods have been implemented in proprietary formats including HTTP Live Streaming ("HLS") by Apple, Inc., and HTTP Smooth Streaming by Microsoft, Inc. adaptive bit rate streaming has been standardized as ISO/IEC 23009-1, Information Technology—Dynamic Adaptive Streaming over HTTP ("DASH"): Part 1: Media presentation description and segment formats. Although references are made herein to these example adaptive bit rate protocols, it will be recognized by a person having ordinary skill in the art that other standards, protocols, and techniques for asset delivery may be used.

Figure 1:
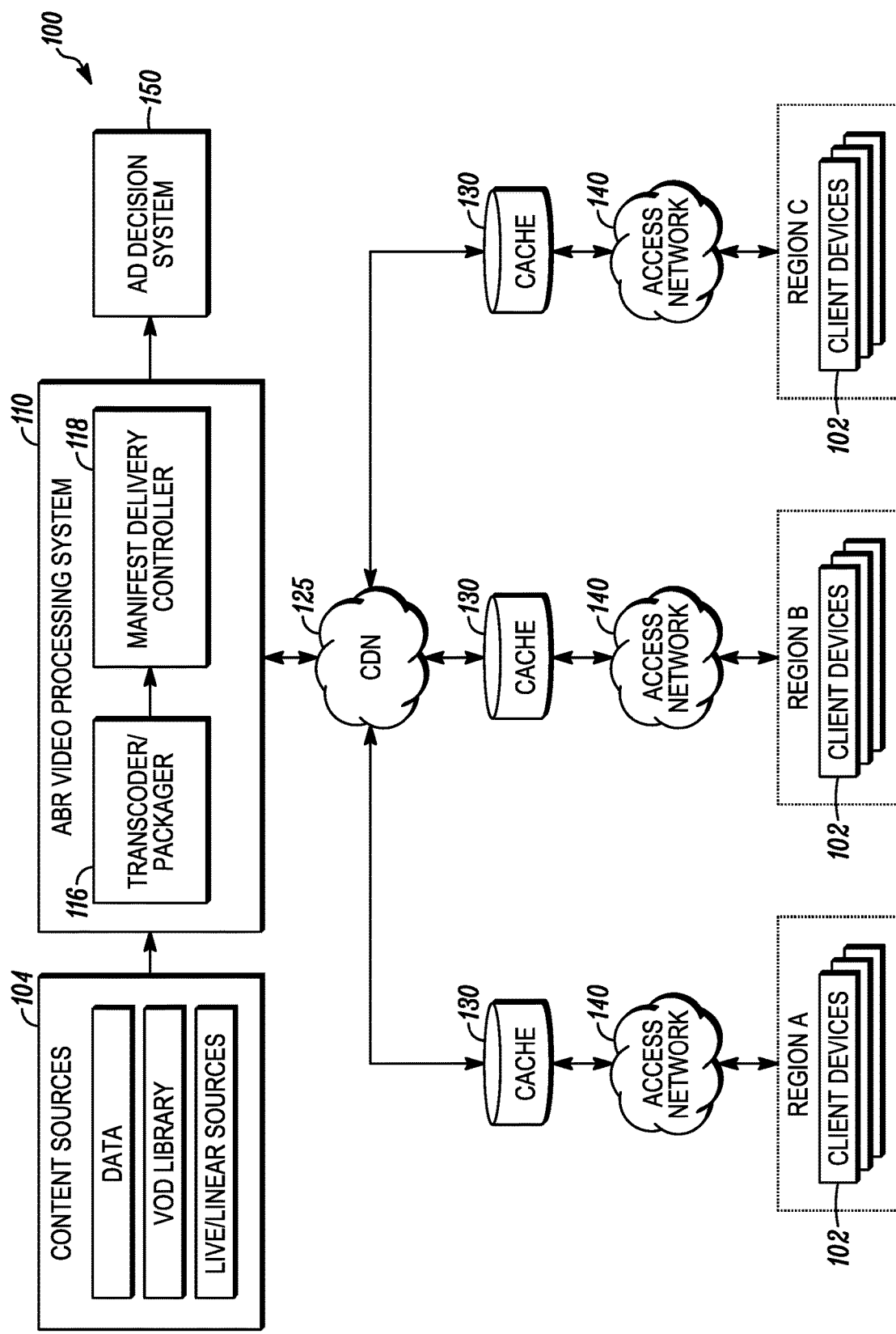
FIG. 1 shows one example of an operating environment in which the techniques, systems and devices described herein may operate.

FIG. 1 shows one example of an operating environment in which the techniques, systems and devices described herein may operate. In particular, FIG. 1 depicts a high-level functional block diagram of a representative adaptive bit rate system 100 that delivers content to adaptive bit rate client devices 102. An adaptive bit rate client device 102 is a client device capable of providing streaming playback by requesting an appropriate series of segments from an adaptive bit rate system. The ABR client devices 102 associated with users or subscribers may include a wide range of devices, including, without limitation, digital televisions, set top boxes (STBs), digital media players, mobile communication devices (e.g., smartphones), web media players, computer applications, home media hubs, video gaming devices, video game consoles, video teleconferencing devices, and the like. The ABR client device 102 may be a receiver or gateway that acts as the next step for delivery to further downstream viewing devices.

The content made available to the adaptive bit rate system 100 may originate from various content sources represented by content source 104, which may provide content such as live or linear content, VOD content and Internet-based or over-the-top (OTT) content such as data, images, graphics and the like. The content is provided to an ABR video processing system 110 that is responsible for ingesting the content in its native format (e.g., MPEG, HTML5, JPEG, etc.) and processing it as necessary so that it can be transcoded and packaged. The ABR video processing system 110 includes the transcoders and packagers 116 that are responsible for preparing individual adaptive bit rate streams. A transcoder/packager 116 is designed to encode, then fragment the media files into segments and to encapsulate those files in a container expected by the particular type of adaptive bit rate client. The adaptive bit rate segments are available at different bit rates, where the segment boundaries are aligned across the different bit rates so that clients can switch between bit rates seamlessly at the segment boundaries. Media streams from a content provider may include in-band ad break signals (e.g. SCTE 30 splice/cue messages) to be used by the transcoder to define frame-accurate segment boundaries on both sides of the break. Similar methods can be used to indicate segment boundaries within VOD assets for precise mid-roll insertion or to define boundaries prior ad periods that are to be replaced.

Along with the delivery of media, the ABR video processing system 110 also includes a manifest manipulator such as a manifest delivery controller (MDC 118) that creates the manifest files for each type of adaptive bit rate streaming protocol that is employed. In adaptive bit rate protocols, the manifests describe the various media types, formats, and set of media segments to be played along with uniform resource links (URLs) for downloading each media segments. The client determines the format the client desires and then uses the manifest to download media segments. The client may repeatedly get updates of the manifests to discover dynamic content such as a live stream that appends newer segments.

For HLS the manifests consists of two layers. The master playlist (aka main manifest) describes the various formats (resolution, bit rate, codec, language, etc.) that are available for a given asset or content stream. For each format, a corresponding media playlist (e.g., a sub-level manifest or profile manifest) may be provided. The media playlist describes each media segments available to the client with a URL link for each segment. For DASH the manifest is called an MPD (Media Presentation Description) that can be divided into one or more periods of media. The MPD period may include descriptions of the set of representations and adaptation sets for various media types and formats (resolution, bit rates, codecs, language etc.). These each have a segment template or segment list that defines the associated media segments available for the client to download. For simplicity the term "manifest" will be used herein to describe the various methods of listing the media segments to be used by a client for playback.

The individual adaptive bit rate streams are typically posted to an HTTP origin server (not shown) or the like so that they can be accessed by the client devices 102 over a suitable content delivery network (CDN) 125, which may be in communication with various edge caches 130. In some cases the edge caches 130 are in turn in communication with one or more client devices 102 in one or more regions through one or more access networks 140 that each serve a designated region. By way of a non-limiting example, FIG. 1 depicts an example of the ABR Video Processing System 110 residing within a data center in communication with three regions A, B and C. However, the central data center can be in communication with any desired number of regions. CDN 125 and access networks 140 may comprise any suitable network or combination of networks including, without limitation, IP networks, multicast media transports, hybrid fiber-coax (HFC) networks, and the like. It should be noted that the various systems and components of the adaptive bit rate system 100 shown in FIG. 1 may be in any suitable location or locations. To the extent they are not co-located, they may communicate over one or more networks such as an IP-based network. For example, while the embodiment of FIG. 1 shows the MDC 118 being co-located with the packager 116, in alternative embodiments the MDC 118 may be located downstream of the packager 116. In one particular embodiment, for instance, the MDC 118 may be co-located to cache 130. More generally, the MDC 118 may be provided at the point of packaging, as a distinct service, as a proxy, in a home gateway, within the application or client device, and so on.

As previously mentioned, the manifests provided by the MDC 118 include links for the segments associated with the multimedia content to be retrieved by the client devices. In addition, the manifest may include placement opportunities markers or events that denote insertion points in which the MDC 118 can insert alternative content such as advertisements. These may also indicate periods of media segments that provide placement opportunity to be replaced with alternate content such as advertisements (e.g. national ad break period, or prior recording with older ads that can be replaced with newer). As described earlier, these ad break markers are often provided as signals to a transcoder. In other cases the multimedia content does not have markers but an ad decision system, or more generally, an asset decision system referred to generally herein as an ADS, may provide specific insertion/replacement points such as pre-roll, mid-roll, or post-roll offsets in a VOD asset. For simplicity these will all be referred to herein as placement opportunities and insertion points. When a placement opportunity is detected, the MDC 118 may retrieve the links for the alternative content from different sources, such as an ad decision system (e.g., ad decision system 150 shown in FIG. 1) in the case of advertisements. The ADS may determine the ad (or collection of ads) that is to be inserted into the manifest at the insertion point denoted by the placement opportunity and provide the MDC 118 with the appropriate links to the selected ad(s), which the MDC 118 in turn will incorporate into the manifest. Communication between the MDC 118 and the ADS use protocols such as the Society of Cable Telecommunications Engineers (SCTE) 130-3 and the IAB Video Ad Serving Template (VAST), for example, to retrieve the advertisement that needs to be spliced into the manifest.

VAST, for instance, specifies how an ad is to be displayed or played from an ad server. The VAST ad placements include a URL for impression counting to be made when the video is played. VAST also enables event tracking URLs (e.g., first quartile viewing, midpoint viewing, third quartile viewing, complete viewing, pause, rewind, mute, etc.). SCTE includes a different method for each ad insertion to provide tracking using the SCTE 130-3 PlacementStatus-Notification (PSN) message.

This information, which provides insights in the ad delivery or playback process, can be obtained by many methods. An mpeg splicer typically provides signals that result in SCTE 130-3 PSN as the ad is spliced into an output transport stream. A client side ad insertion solution typically obtains the VAST decision and directly invokes the tracking URLs for each ad playback event.

Figure 2:
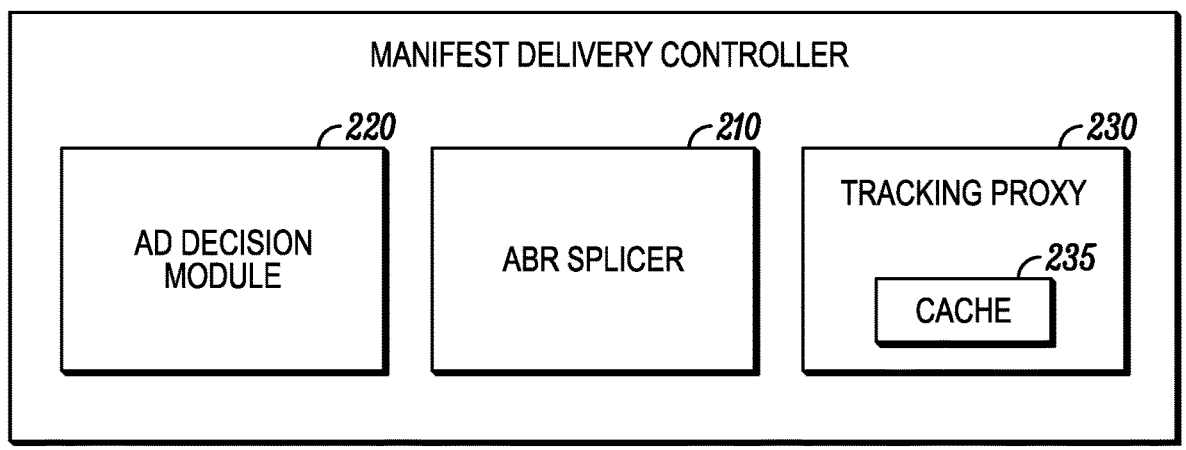
FIG. 2 shows a functional block diagram of one example of a manifest delivery controller (MDC) that includes a tracking proxy which acts as an intermediary between the ADSs and the client devices.

A manifest manipulator like the MDC needs the ability to integrate with and provide the necessary tracking to various types of ADSs. To address this problem, FIG. 2 shows a functional block diagram of one example of an MDC that includes a tracking proxy which acts as an intermediary between the ADSs and the client devices. The tracking proxy receives feedback for ad delivery or playback events from the client devices and in turn forwards them on as SCTE or VAST tracking events to the appropriate ADSs. It should be noted that FIG. 2 only shows those functional components pertinent to the ad tracking process and omits other well-known components. Moreover, it should be further noted that the functionality of each of these components may be distributed among other components in the ABR streaming system. For example, the functionality of the tracking proxy need not necessarily be incorporated in the MDC but may be located elsewhere.

As shown, the MDC 200 in FIG. 2 includes an ABR manifest splicer 210, an ad decision module 220 and a tracking proxy 230. The ABR manifest splicer 210, among other things, is used to receive a manifest for content requested by the client device and insert advertisements or other asserts at placement opportunities denoted in the manifest. The ad decision module 220 requests ads from the ADSs which are to be inserted into the manifest at the placement opportunities. Finally, as noted above, the tracking proxy 230 acts as an intermediary between the client devices and ADSs so that feedback for delivery and playback are returned to the tracking proxy and not directly to the ADSs (although in some cases a direct option may still be preserved). The tracking proxy 230 includes a memory such as a cache 235 (e.g., memcached). This memory retains the tracking proxy data (tpData) so that when a client device later gives feedback the tracking proxy can lookup previously saved SCTE 130-3 PSN or VAST Tracker URLs for the event type. Operation of the aforementioned components of the MDC 200 will be further explained with reference to the message sequence diagram shown in FIGS. 3A-3C.

Starting at 1, the client device sends a request for streaming content to the ABR manifest splicer in the MDC. The ABR manifest splicer, in turn, sends the request at 2 over a content delivery network to a source from which the content is available. At 3 the packager of the requested content sends the manifest splicer the updated manifest for the content with placement opportunities located therein. The placement opportunities will be illustrated herein as being breaks for advertising (ads). More generally, the placement opportunities may be used to insert any suitable content and not simply advertisements, which are described herein for illustrative purposes. One such ad break in the manifest is detected at 4, at which time the ad decision module in the MDC continues the process as explained below to resolve the ad decision and insert the necessary ad URLs and tracking elements into the manifest.

At 5 the ad decision module requests an ad decision from a first or primary ADS in accordance with a suitable protocol such as VAST or SCTE 130-3. The primary ADS may resolve the ad decision itself or it may redirect the request to one or more third party ADSs. In this example the primary ADS at 6 uses the VAST protocol to provide some of the ads but also may include ad spot(s) that perform a wrapper redirect to $3^{rd}$ party ADSs such as ADS 2 and ADS 3. The $3^{rd}$ party ADSs may work together to form an ad decision or perform further levels of the wrapper redirects (not shown). MDC policies may restrict the number of redirects, the time for processing redirects, or redirected ADSs may be excluded by blacklist or whitelist. If a redirect is restricted, that spot within the placement decisions is skipped or filled with a fallback ad. Accordingly, the ADS decision module of the MDC follows the wrapper redirect URLs and sends another ad decision request to ADS 2 at 7. At 8 ADS 2 returns the ad URLs and the tracking data, which specifies those playback events they wish to track. The ad URL provides a link to the manifest for the media file that defines the ad that is to be inserted into the manifest. The tracking data associated with each ad URL provides tracking URLs for each playback event that is to be tracked. For purposes of illustration only the playback events being tracked in this example include, in addition to the ad impression, a start event and an end event. Of course, as previously mentioned, many other playback events may be tracked as well. The VAST response may include multiple ads, and each may contain a collection of tracking URLs for various event types. Often a single ad event type may have multiple trackers to the various ADSs (Primary and 3$^{rd}$ party) and these might also include tracking to other systems. MDC policies may skip some trackers because they are excluded by a blacklist or whitelist, URL pattern rules, allowed event types, or if the number exceeds a defined limit.

Next, at 9, the ad decision module parses the ad URLs and the tracking data to create a data structure (denoted tpData in FIGS. 3A-3C and identified by the key tpDataID) at 10. The data structure includes the tracking URLs for each ADS that is to receive feedback and for each event that is to be tracked. In this example the feedback is to be provided to ADS 1, ADS 2 and ADS 3, with ADS 1 receiving an ad impression and an end event, ADS 2 only receiving an ad impression and ADS 3 receiving an ad impression and start and end events. The data structure may also store options that specify details about how the feedback is provided to the ADSs. Examples of such options include, by way of example, the type of feedback method (SCTE or VAST), number of retries or timeouts that may be performed, the degree to which data from individual client devices should be anonymized to prevent them from being identified, the rate at which feedback should be provided to individual ADSs (rate smoothing) and so on. At 11 the resulting data structure is stored in the MDC cache so that it will be available later when feedback is given.

After saving the selected tracking URLs for the various tracking events and storing the resulting data structure in the MDC cache, the Ad decision module at 12 creates from this data the callback URLs (denoted tpURLs in FIGS. 3A-3C) that are to be inserted into the manifest to be delivered to the client device. Each event type that is tracked has a callback URL that is returned by the client device to the MDC when the event occurs. That is, each callback URL points back to the tracking proxy in the MDC so that the tracking proxy is notified when the event occurs. In addition, the callback URLs may include other parameters that are returned to the tracking proxy, some of which, for example, may indicate that other actions have been performed by the client device instead of or in addition to the designated tracking event. In some cases the callback URL can encode all necessary tpData (simple options and trackers) so that once it is returned in step 16 there will be no need to perform a lookup from cache (i.e., steps 11 and 19 may be optionally skipped). At 13 the ad URLs and their associated callback URLs are provided to the splicer and at 14 the splicer inserts them into the manifest.

The manner in which the callback URLs are inserted into the manifest so that they will be returned to the tracking proxy will depend in part on the type of client device to which the manifest is being sent. For instance, some relatively sophisticated client devices are able to distinguish between programming content and ads and are able to read additional information that may be provided in the manifest such as VAST tracking elements and/or callbacks from HLS TAGS or DASH events (referred to as EventStreams). These client devices will be able to pass back to the tracking proxy all callback URLs included in the manifest. These clients may have a more rich set of playback events that they can trigger such as MUTE. The tracking can also be invoked more precisely as the playback reaches actual start/end for rendering the ad.

On the other hand, relatively simpler client devices may not be aware of things such as VAST tracking elements, HLS TAGS or DASH events and thus require an alternative approach. For these client devices alternative techniques may be used to ensure that callback URLs are returned to the tracking proxy. In these situations the callbacks may be inserted so that they appear to the client devices as URLs for media segments. However, the media segment may be a null/empty segment that contains no data but simply calls or otherwise points to the tracking proxy which returns a 0 byte payload. Alternatively, the URL for media segments may call to the tracking proxy, which in turn redirects the client device to another URL at which an actual media segment may be located. Lastly, it may be sufficient for some live feeds to infer the feedback as a result of a client continuing to request updated manifests over the period that the ad was inserted (recognizing playback delay offsets). In all these cases the tracking proxy utilizes some common player behavior to decipher feedback events such as the start and end of the ad delivery.

After the manifest splicer inserts the ad URLs the callback URLs into the manifest at 14, the splicer delivers the manifest to the client device at 15. In this way the client devices will be able to fetch the media segments for the ad(s) and will return the callback URLs upon performing the playback events specified by those callback URLs.

At 16 the client device begins playing a specified ad and returns to the tracking proxy a callback URL for a start event. At 17 the tracking proxy may optionally send the client device an acknowledgement that the callback URL was received. This may be necessary to send since in some cases the client device may stall until an acknowledgement is received. If such an acknowledgement is not necessary to prevent an interruption in the operation of the client device, it alternatively may be sent at the completion of the process being performed by the tracking proxy.

Figure 3A:
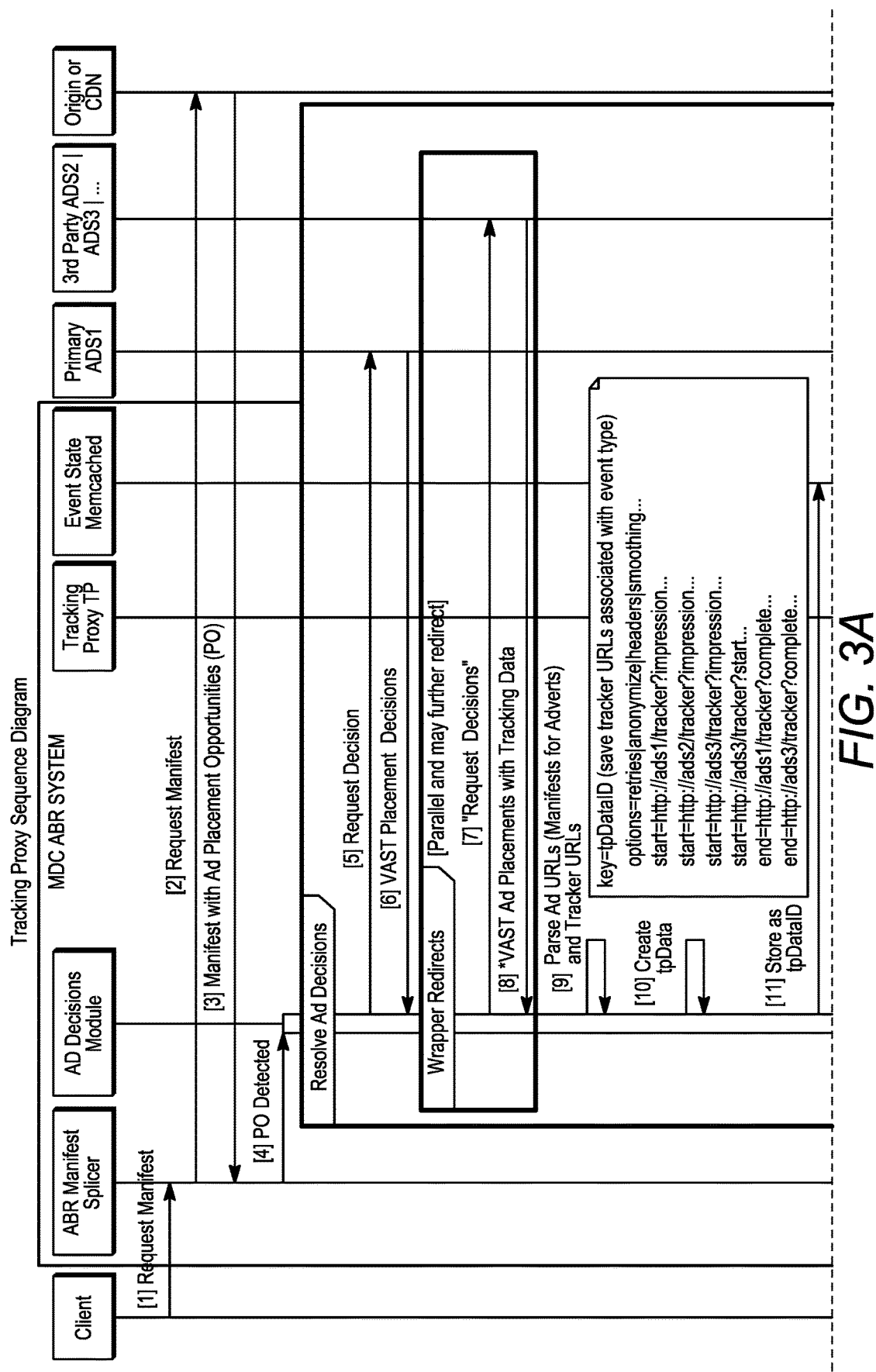
FIGS. 3A-3C show a message sequence diagram of one example of a method for tracking client playback events when playing an asset specified in a manifest for streaming adaptive bit rate (ABR) content.
Figure 3B:
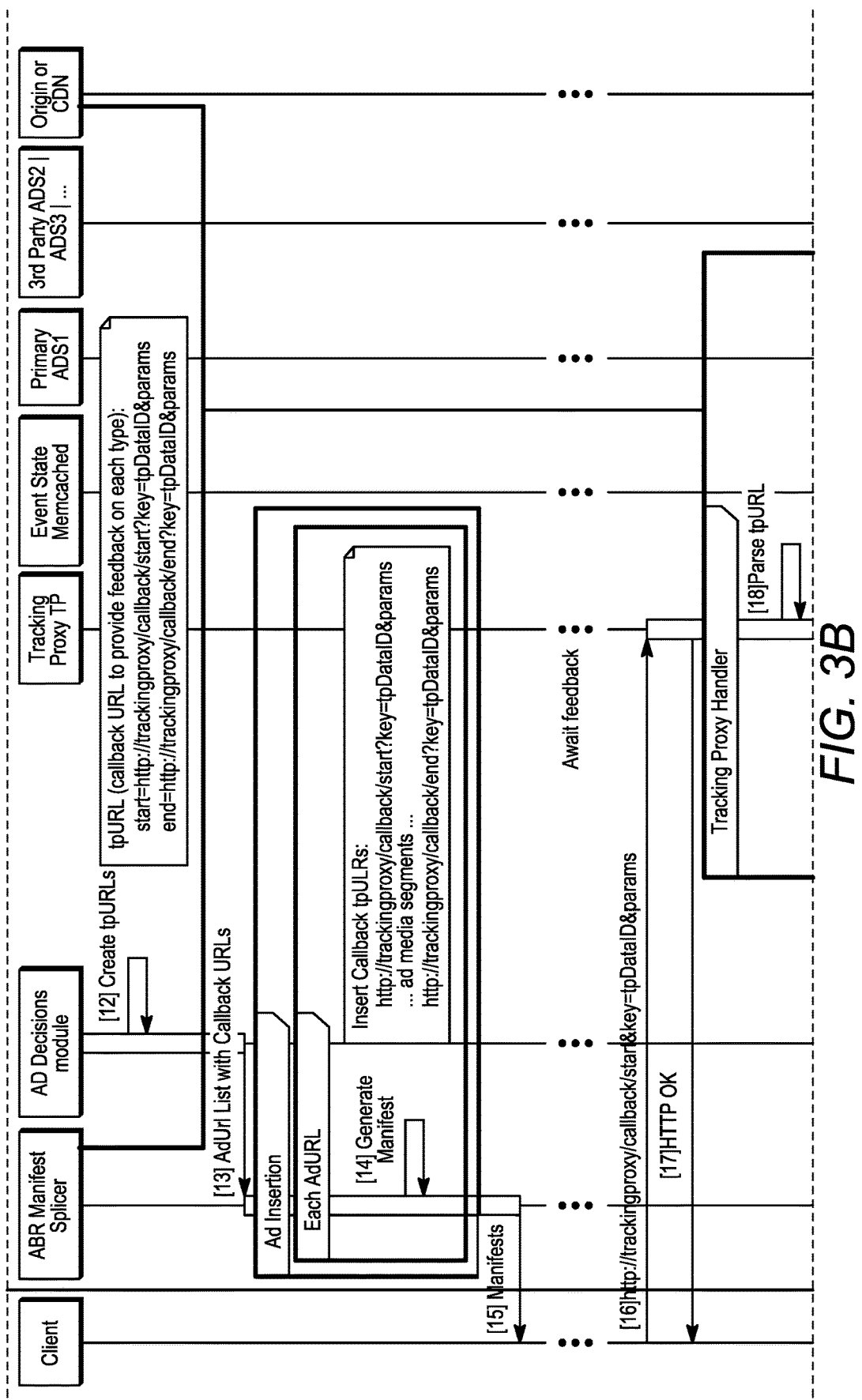
Figure 3C:
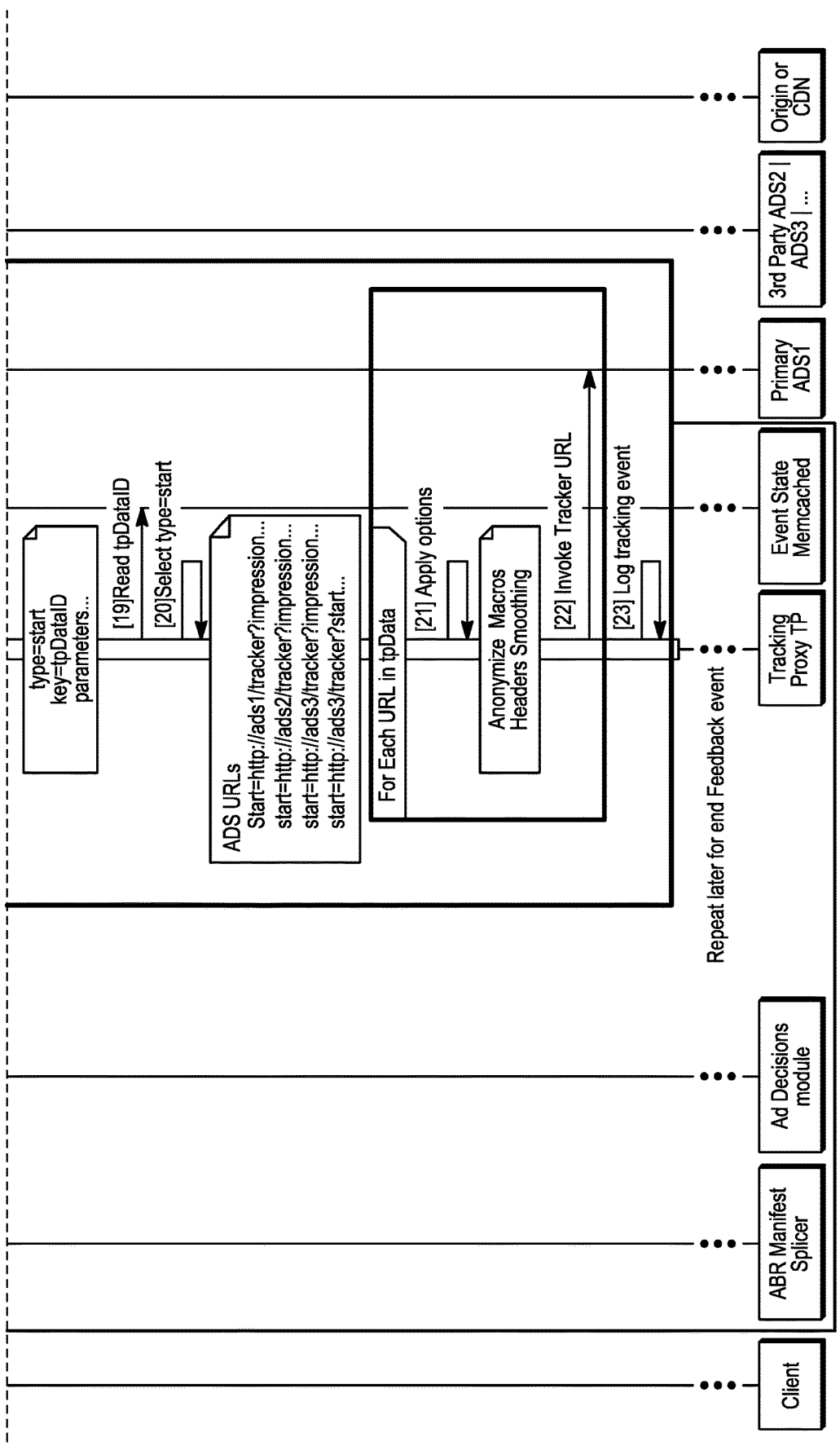

The tracking proxy then parses the callback URL at 18 to identify the event type, the identifier (key) of the data structure stored in the MDC cache that contains the tracking URLs associated with the callback URL, and any other parameters or the like that are contained in the callback URL. Using the key (tpDataID in this example) the tracking proxy reads the data in the data structure from the MDC cache. At 20 the tracking proxy identifies the data from the data structure which corresponds to the event type associated with the callback URL that has been received. In the example of FIGS. 3A-3C this event type is illustrated as a start event. At 20 the tracking proxy selects from the saved data the tracking URLs for this particular event. These tracking URLs will be sent to the designated ADSs using the appropriate protocol employed by the ADS to inform them that the event has occurred. First, however, at 21 the tracking proxy applies any functions to the tracking URLs that are specified by the stored options or the parameters received back from the client device. As previously mentioned such options may specify details about how the feedback is provided to the ADSs, such as whether rate smoothing should be performed. There are many examples of smoothing functions that may be employed, such as by use of a queue that limits the maximum number of outstanding transactions, a pacing function that sets rate for sending transactions, or a scheduler that inserts a random delay to spread out each transaction. Such rate smoothing may be used to ensure that the ADSs do not receive more tracking URLs in any given period of time than they are to process. This may be a particular problem, for example, at time periods when ad breaks are aligned such as the top of the hour or when a popular program is beginning to be simultaneously delivered to many client devices. Finally, the tracking proxy logs the tracking event at 21.

The system described above employs an IP-based distribution system to deliver content to client devices using ABR streaming techniques. These ABR systems are able to stream content to individual client devices and receive tracking events from these individual client devices. However, many service providers today have existing legacy distribution systems (e.g., QAM-based systems) in which client devices such as set top boxes, for example, tune to a particular frequency or channel on which content is being delivered. In this way multiple client devices are able to receive the same content by tuning to the same frequency.

Since such legacy shared distribution systems aggregate client devices, and because there is not a robust feedback or backchannel mechanism for receiving individualized tracking events from those clients, the techniques described above for performing ad tracking are not usable in such systems. However, because some service providers have expressed interest in using their ABR systems to service their clients that receive QAM-based services as well as their clients that receive ABR streaming content, devices are being developed to convert ABR video streams back to MPEG transport streams in order to support legacy delivery techniques such as QAM-based techniques that deliver content to legacy devices such as set top boxes. Such devices, referred to herein as an ABR to Legacy Transport Stream (ALTS) converter, may be located at the network edge in order to deliver the content over a legacy access network (e.g., an HFC network). One example of a commercially available ALTS converter is the Video Unified Edge (VUE) product available from CommScope.

Although references are made herein to legacy transport streams with QAM based delivery techniques, it will be recognized by a person having ordinary skill in the art that other shared distribution systems can allow similar functions such that the real time tracking proxy can indicate a multiplicity of viewers for a single ad placement. Shared distribution systems may include, for example, a multicast ABR system where a controller determines the viewer from the number of active joins, or inserting ads into a shared manifest on a CDN and using a session router or DRM key management to determine active users of that manifest.

The ALTS converter is generally located between the MDC and the legacy access network. This is illustrated in the simplified schematic diagram of FIG. 4, which shows MDC 200, ALTS converter 250, QAM via HFC access network 260 and client devices 270, which in this example are set top boxes. The ALTS converter 250 serves to translate an ABR video stream received from MDC 200 into a multicast transport stream such as an MPEG transport stream, which can then be delivered to multiple clients over the access network 260.

Figure 4:
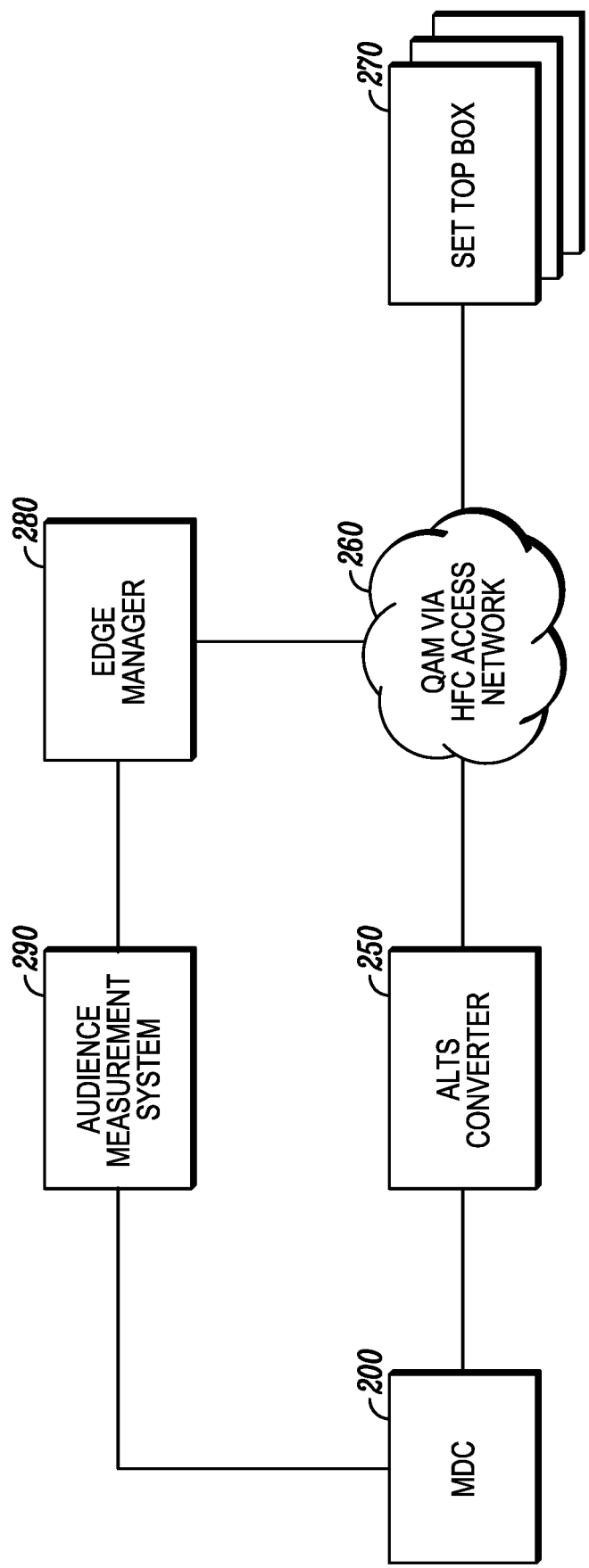
FIG. 4 shows an alternative example of an operating environment in which the techniques, systems and devices described herein may operate, which employs a shared channel delivery system for delivering content to a multiplicity of client devices.

Also shown in FIG. 4 are edge manager 280 and audience measurement system 290. Edge manager 280 is used by legacy systems to allocate frequencies or channels that are used to deliver content to the STBs 270 over the access network 260. For instance, in a switched digital video (SDV) system the edge manager 280 may be an SDV session manager that monitors and allocates SDV channels. The edge manager 280 performs these tasks by communicating with the STBs 270 (via access network 260). In particular, the edge manager 280 receives tune-in and tune-out events when individual STBs tune in and tune out of a particular frequency on which content is being delivered. Audience measurement system 290 is able to keep track of these tune in and tune out events and thus is able to determine the number of STBs 270 that are tuned in to a particular frequency at any given time and hence determine the number of STBs 270 that are viewing the content on that frequency at any given time. In this way the audience measurement system 290 is able to keep track of the number of viewers watching the content, including ads, at any given time on the channels being monitored by the edge manager 280. The audience measurement system 290 may be able track and update the viewership information on a relatively short basis (e.g., at 1 second intervals) so that it can dynamically monitor changes in the number of viewers. In this way the audience measurement system 290 can track the current number of viewers so this can be available to MDC 200 at the time period of each ad.

Since the audience measurement system 290 is able to track in time increments as short as e.g., 1 second, the MDC 200 is able to determine how many impressions were made and provide viewership information over the time period of the ad. This information can be passed back to the tracking proxy, which in turn can pass it on in the appropriate manner to the ADSs.

Figure 5A:
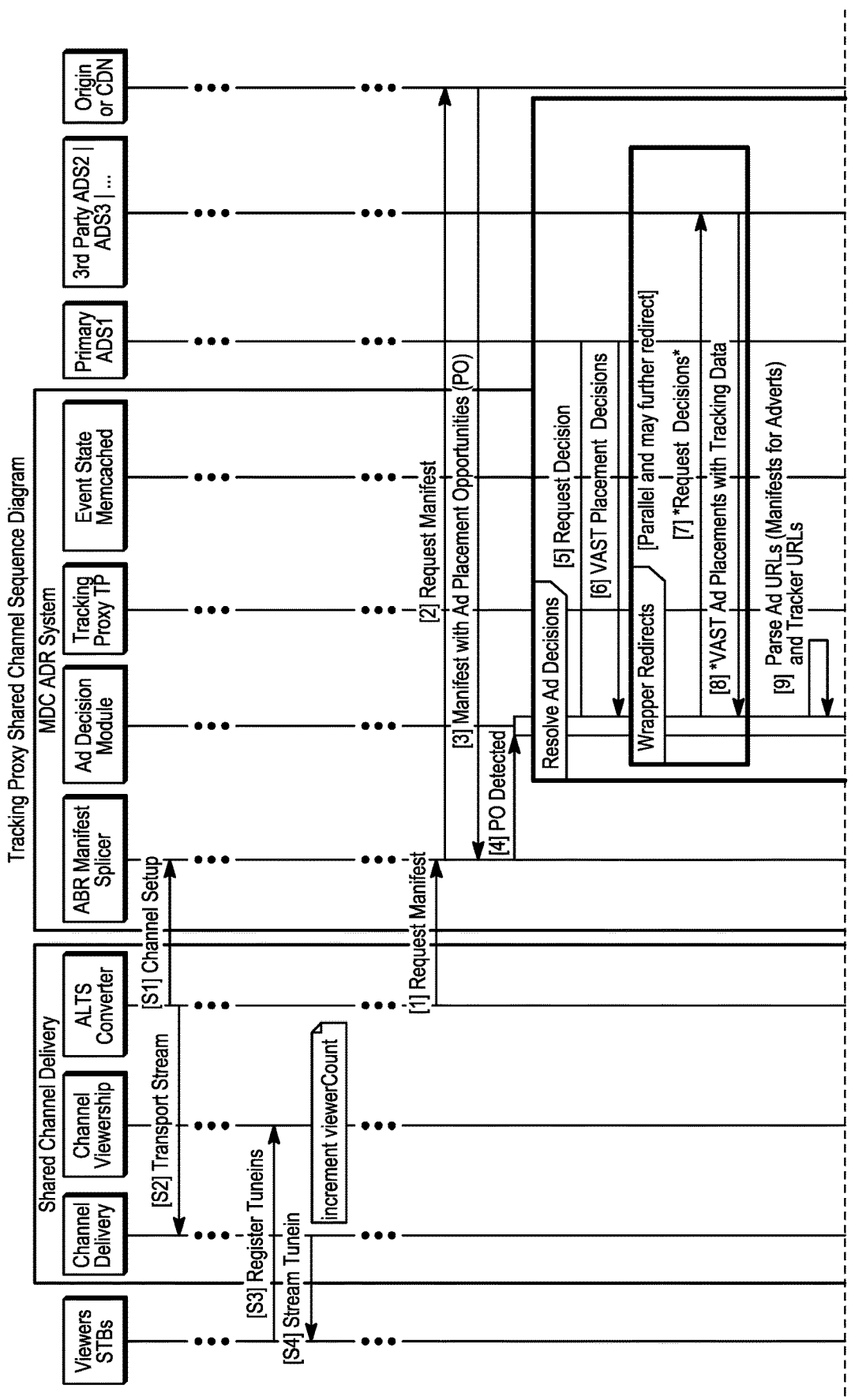
FIGS. 5A-5C show a message sequence diagram of one example of a method for tracking client playback events when a multiplicity of client device such as set top boxes receive content over a shared channel delivery system such as shown in FIG. 4.
Figure 5B:
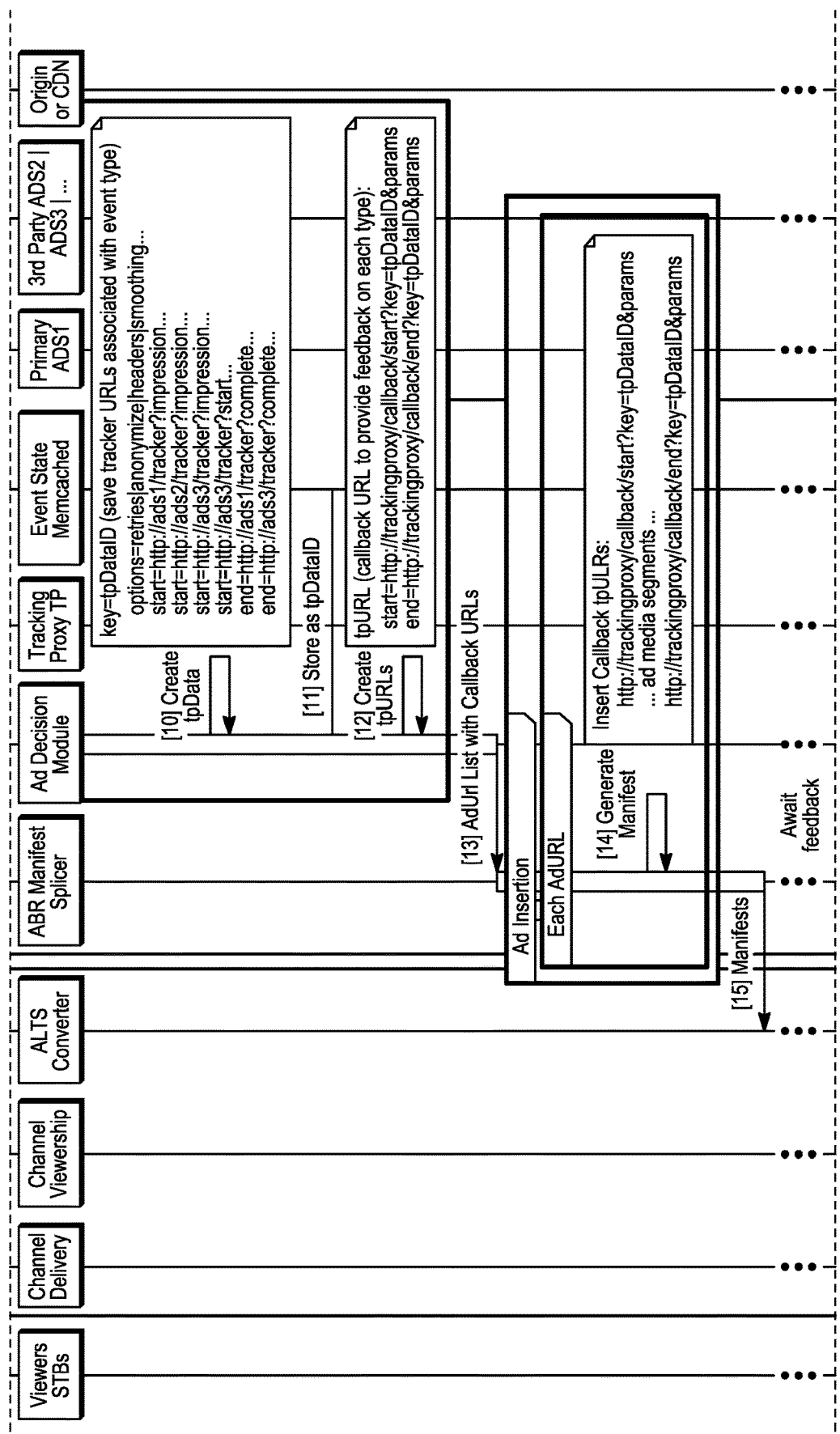
Figure 5C:
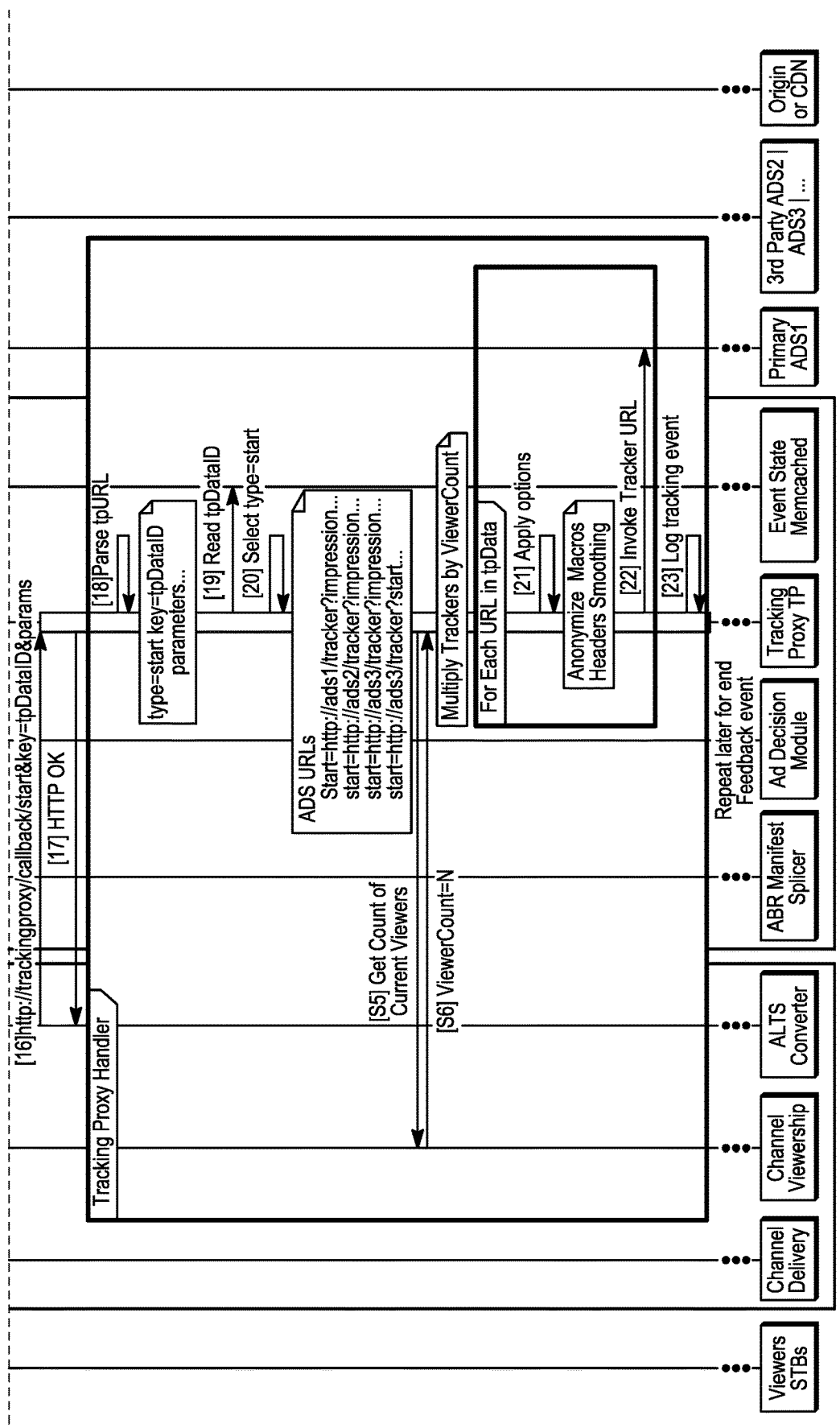

FIGS. 5A-5C shows a message sequence diagram similar to that shown in FIGS. 3A-3C except FIG. 5A-5C includes the aforementioned components of the shared channel delivery system described above, which in this example includes ALTS converter 250, audience measurement system 290 and access network 260. Messages 1-17 in FIGS. 5A-5C are largely the same as shown in FIGS. 3A-3C, except that in FIGS. 5A-5C the ALTS converter 250 serves as the client that communicates with the various components of the MDC 200. Additional steps S1-S5 in FIGS. 5A-5C illustrate the communication between the ALTS converter 250 and the STBs 270 and additional steps S5 and S6 illustrate the feedback provided by the ALTS converter 250 to the MDC 200.

As shown at S1, the ALTS converter 250, acting as the client, establishes an ABR session with the MDC in order to set up the channel. As the ALTS converter 250 receives the media segments, it transforms them into a transport stream that is delivered to the access network at S2. In this way the access network is able to provide the STBs with a shared channel that they are able to tune into. At S3 one or more STBs register to tune in to the channel and the audience measurement system 290 increments its viewer count accordingly (likewise, the audience measurement system 290 will decrement its viewer count when a tune out event is received from an STB). At S4, the STB receives the content on the channel being delivered as a part of the transport stream.

When a placement opportunity is detected the ad decision module behaves similar to the previous description. This may include storing the ADS tracking URLs in step 11 and injecting the callback URLs in step 14 along with the ad segments. The ALTS converter 250 can then act the same as the clients in the previous description where it detects the time of delivering the media into the transport stream and then callback to the tracking proxy in step 16. In alternative embodiments the correct timestamp of events may be captured but the callback may be held back to ensure channel viewership has a chance to be completed. Alternatively, offsets may be added to the timestamp that can correct for any further delays in the system. In a simplified but less precise embodiment the ALTS converter 250 may not need to provide callbacks and instead the MDC may calculate a timer after inserting the ad media segments into the manifest. The timer can determine the duration of time that is expected to transpire until the ad is to be played. That is, an offset of the ad can be used to factor in delays until the ad is presented. The timer may contain all the same attributes that would have previously been expected in a callback URL in step 16.

Based on the callback or timer the tracking proxy handler proceeds to step 19. The tracking proxy, at S5, requests the current number of STBs that were tuned to the channel at the time the ad was started. At S6 this count is returned to the tracking proxy. The tracking proxy may then communicate this information to the ADSs in one of two ways. First, the count may be passed as a parameter or attribute on the tracker. Alternatively, the tracker may be invoked once for each count, which is generally the traditional manner in which the ADSs expect to receive the information.

The viewer count may also be logged in step 20. In an alternative embodiment the viewer count may be called periodically to allow the MDC to monitor ongoing channel viewership. In yet another approach the viewer count may be determined before the placement opportunity is sent to the ADS so that it can make more informed decisions on potential viewers for ad placements.

Figure 6:
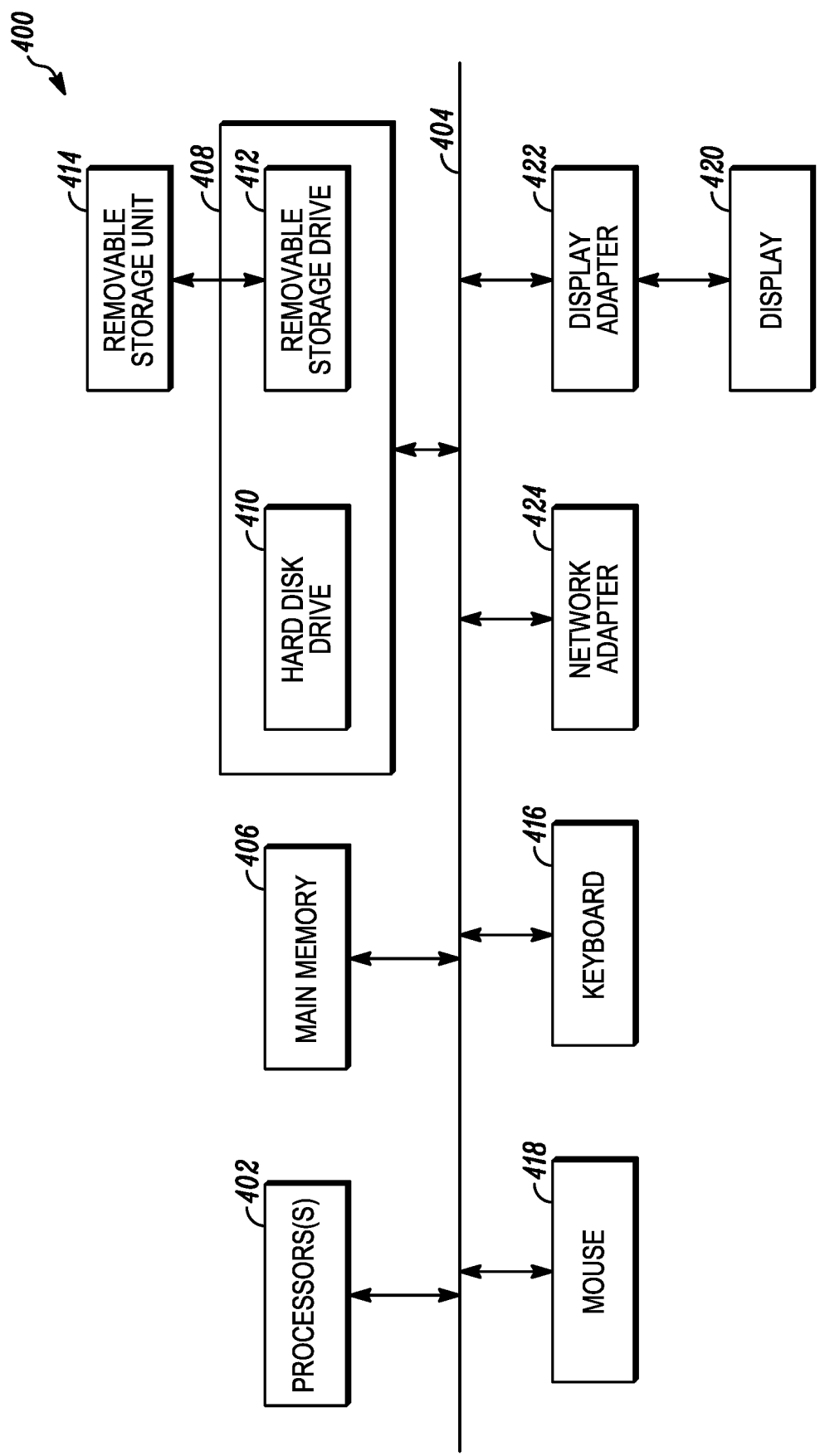
FIG. 6 illustrates a block diagram of one example of a computing apparatus 400 that may be configured to implement or execute one or more of the processes performed by any of the various devices shown herein

FIG. 6 illustrates a block diagram of one example of a computing apparatus 400 that may be configured to implement or execute one or more of the processes performed by any of the various devices shown herein, including but not limited to the MDC generally or the tracking proxy, the ABR splicer, and/or the ad decision module in particular. It should be understood that the illustration of the computing apparatus 400 is a generalized illustration and that the computing apparatus 400 may include additional components and that some of the components described may be removed and/or modified without departing from a scope of the computing apparatus 400.

The computing apparatus 400 includes a processor 402 that may implement or execute some or all of the steps described in the methods described herein. Commands and data from the processor 402 are communicated over a communication bus 404. The computing apparatus 400 also includes a main memory 406, such as a random access memory (RAM), where the program code for the processor 402, may be executed during runtime, and a secondary memory 408. The secondary memory 408 includes, for example, one or more electronic, magnetic and/or optical storage devices 410 and/or a removable storage drive 412, where a copy of the program code for one or more of the processes described herein may be stored. The removable storage drive 412 reads from and/or writes to a removable storage unit 414 in a well-known manner.

As disclosed herein, the term "memory," "memory unit," "storage drive or unit" or the like may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, a SIM card, other smart cards, and various other mediums capable of storing, containing, or carrying instructions or data. However, computer readable storage media do not include transitory forms of storage such as propagating signals, for example.

User input and output devices may include a keyboard 416, a mouse 418, and a display 420. A display adaptor 422 may interface with the communication bus 404 and the display 420 and may receive display data from the processor 402 and convert the display data into display commands for the display 420. In addition, the processor(s) 402 may communicate over a network, for instance, the Internet, LAN, etc., through a network adaptor 424.

The claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable storage medium embedded with a computer executable program, which encompasses a computer program accessible from any computer-readable storage device or storage media.

Moreover, as used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between to or more computers. All functions performed by the various components, modules, engines, systems, apparatus, interfaces or the like may be collectively performed by a single processor or each component, module, engine, system, apparatus, interface or the like may have a separate processor.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein may be combined to achieve a particular functionality can be seen as "associated with" each other such that the desired functionality is achieved, irrespective of architectures or intermediary components. Likewise, any two components so associated can also be viewed as being "operably connected", or "operably coupled", to each other to achieve the desired functionality.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the embodiments of the invention.

The invention claimed is:

1. A method for tracking client playback events when playing an asset specified in a manifest for streaming adaptive bit rate (ABR) content, comprising:
    generating, with a manifest manipulator, a manifest that includes (i) an asset Uniform Resource Locator (URL) inserted at a marker denoting a placement opportunity in a content manifest requested by a client, the asset URL specifying a link to a file that includes an asset and (ii) one or more callback URLs for tracking playback events to be returned by the client when a specified playback event is performed by the client while playing the asset;

using the manifest manipulator to send the manifest to the client;

receiving at least one of the callback URLs indicating that the client has performed the playback event specified by the at least one callback URL;

responsive to the receipt of the at least one callback event, obtaining, with a tracking proxy associated with the manifest manipulator, a tracking URL to be sent to at least one asset decision system participating in an asset decision process that resulted in providing the asset URL to the manifest manipulator; and sending the tracking URL from the tracking proxy to the at least one asset decision system.

2. The method of claim 1, further comprising:

sending a request from the manifest manipulator to a first asset decision system to resolve the asset decision for the placement opportunity; and subsequent to sending the request, receiving at the manifest manipulator the asset URL and tracking data associated therewith.

3. The method of claim 2, further comprising:

obtaining the tracking URLs for each type of playback event to be tracked from the tracking data; and creating and storing a data structure associated with the asset URL that includes the tracking URLs obtained from the tracking data.

4. The method of claim 3, further comprising storing in the data structure one or more options specifying how the tracking URLs are to be sent to the at least one asset decision system.

5. The method of claim 4, wherein the options are selected from the group including a specification of a feedback method to be employed when sending the tracking URLs to the at least one asset decision system, a specification of number of retries or timeouts that may be performed, a degree to which data from individual clients should be anonymized to prevent them from being identified, and ability to smooth or adjust the rate at which feedback should be provided to individual asset decision systems.

6. The method of claim 2, wherein the asset URL is received from a second asset decision system to which the request is caused to be redirected by the first asset decision system.

7. The method of claim 6, wherein sending the tracking URL from the tracking proxy to the at least one asset decision system includes sending at least a first tracking URL to the first asset decision system and at least a second tracking URL to the second asset decision system.

8. The method of claim 7, wherein the first and the second tracking URLs track different playback events performed by the client while playing the asset.

9. The method of claim 1, wherein the one or more callback URLs includes a plurality of callback URLs, each of the callback URLs tracking a single type of playback event.

10. The method of claim 1, wherein at least one of the one or more callback URLs are incorporated in the manifest as VAST tracking elements, HLS TAGS and/or DASH events.

11. The method of claim 1, wherein the one or more callback URLs are incorporated in the manifest as a media segment URL pointing to the tracking proxy.

12. The method of claim 11, wherein the tracking proxy returns a zero byte payload in response to receipt of the callback URL.

13. The method of claim 11, wherein, in response to receipt of the callback URL, the tracking proxy returns a media segment URL at which a media segment is available.

14. The method of claim 1, wherein sending the tracking URL from the tracking proxy to the at least one asset decision system includes sending a plurality of tracking URLs to individual asset decision systems using a queue that performs rate smoothing to ensure that the individual asset decision systems do not receive the tracking URLs at a rate greater than a specified rate.

15. The method of claim 1, further comprising anonymizing individual client data prior to sending the tracking URL to the at least one asset decision system.

16. The method of claim 1, wherein receiving at least one of the callback URLs indicating that the client has performed the playback event includes receiving the at least one callback URL from the client.

17. The method of claim 1, wherein receiving at least one of the callback URLs indicating that the client has performed the playback event specified by the at least one callback URL includes receiving the at least one callback URL from an ABR to Legacy Transport Stream (ALTS) converter that translates streaming ABR content into a multicast transport stream for delivery to the client.

18. A method for tracking client playback events on behalf of one or more asset decision systems that participate in an asset decision process that supplies an asset URL for an asset specified in a manifest for streaming Adaptive Bitrate (ABR) content, comprising:

sending a request from an asset decision request module associated with a manifest manipulator to a first asset decision system to resolve an asset decision for a placement opportunity in a manifest for streaming ABR content that is requested by a client;

subsequent to sending the request, receiving at least one asset Uniform Resource Locator (URL) specifying a link to a file that defines one or more assets to be inserted into the manifest for the placement opportunity and at least one tracking URL that is to provide to at least one asset decision system participating in an asset decision process tracking information concerning playback of the asset by the client;

using a manifest splicer associated with the manifest manipulator to incorporate the asset URL into the manifest;

using the manifest manipulator to send the manifest to the client;

receiving feedback from the client indicating that a playback event has occurred;

in response to receipt of the feedback, determining that a playback event has occurred; and in response to determining that a playback event has occurred, sending, with a tracking proxy associated with the manifest manipulator, a tracking URL to the at least one asset decision system participating in an asset decision process that resulted in providing the asset URL to the manifest manipulator.

19. The method of claim 18, wherein the tracking URL conforms to a Society of Cable Telecommunications Engineers (SCTE) 130-3 PlacementStatusNotification message.

20. The method of claim 18, further comprising:

wherein receiving the feedback includes receiving from the client a request for one or more updated manifests during a period of time that the asset is to be played by the client; and wherein determining that the playback event has occurred includes inferring that the playback event has occurred as a consequence of receiving the request for one or more updated manifests.

21. The method of claim 18, wherein the feedback includes receiving a callback URL from the client indicating that the client has performed a playback event specified by the callback URL, wherein the callback URL was provided to the client in the manifest.

22. The method of claim 18 wherein said at least one asset decision system includes the first asset decision system.

23. The method of claim 18, wherein the playback event is a start event.

24. The method of claim 18, wherein the playback event is an end event.

25. The method of claim 18, further comprising delivering the asset from the client to a multiplicity of viewers over a shared distribution network.

26. The method of claim 18, further comprising determining a number of current viewers using an audience measurement system associated with the shared distribution network.

27. The method of claim 18, further comprising querying an audience measurement system associated with the shared distribution network to determine a number of current viewers at a time when a callback event is received by the audience measurement system.

28. The method of claim 27, wherein the tracking URL includes a parameter indicating a number of current viewers.

29. The method of claim 27, further comprising repeatedly invoking the tracking URL a plurality of times corresponding to the number of current viewers.

30. The method of claim 27, further comprising repeatedly invoking the tracking URL using a queue that performs rate smoothing to ensure that an individual asset decision system does not receive the tracking URLs at a rate greater than a specified rate.

31. The method of claim 30, further comprising logging each invocation of the tracking URL so that a failed invocation of a tracking URL can be replayed or otherwise accounted for.

* * * * *